F. HASKEL.
TWO-PIECE PULLEY CONSTRUCTION.
APPLICATION FILED JUNE 18, 1921.

1,422,263. Patented July 11, 1922.

Inventor
Fred Haskel

By Whittemore, Hulbert, Whittemore
 & Belknap          Attorneys

UNITED STATES PATENT OFFICE.

FRED HASKEL, OF DETROIT, MICHIGAN.

TWO-PIECE-PULLEY CONSTRUCTION.

1,422,263.  Specification of Letters Patent.  Patented July 11, 1922.

Application filed June 18, 1921. Serial No. 478,621.

*To all whom it may concern:*

Be it known that I, FRED HASKEL, a citizen of the United States of America, residing at Detroit, in the county of Wayne and State of Michigan, have invented certain new and useful Improvements in Two-Piece-Pulley Constructions, of which the following is a specification, reference being had therein to the accompanying drawings.

The invention relates to pulleys and has for one of it objects the provision of a construction which may be readily and cheaply manufactured. Another object is the provision of a U-shaped frame which is bendable and has transverse pivot portions on its sides for engagement with a pulley wheel which is insertable between the sides when the latter are separated. Still another object is the forming of the pivot portions upon the sides having greater lengths at their sides farthest from the base of the U. A further object is to provide a bearing upon one of the sides of the frame for reducing the friction between this side and an adjacent object to which the frame is pivoted. With these objects in view, the invention resides in the novel features of construction as more fully hereinafter set forth.

Figure 1:
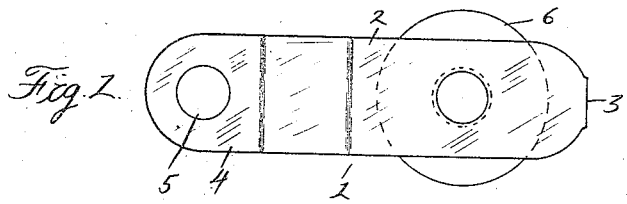
Figure 1 is a side elevation of a pulley embodying my invention.
Figure 2:
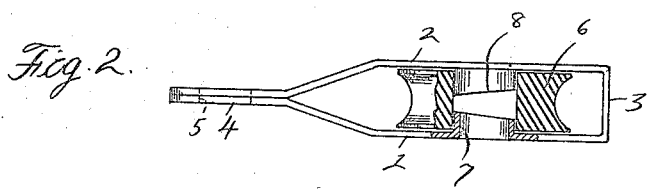
Figure 2 is a top plan view thereof partly in section and with the pulley wheel broken away.
Figure 3:
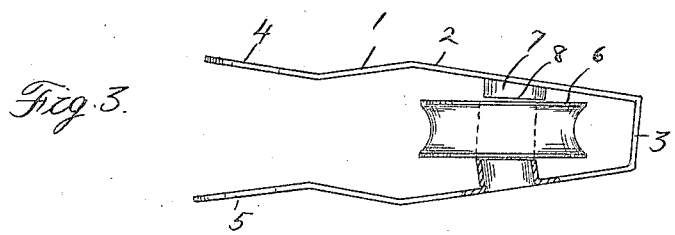
Figure 3 is a top plan view thereof partly in section and showing the sides of the frame separated for the insertion of the pulley wheel.

1 is the pulley frame which is U-shaped and comprises the sides 2 and the base 3, the sides having the inwardly bent free ends 4 which are adapted to lie adjacent to each other and to be secured together by suitable means passing through the aligned apertures 5 therein. 6 is the pulley wheel which is rotatably mounted upon the pivot portions 7 extending transversely inward from the sides 2. To permit of readily assembling the pulley, the U-shaped frame 1 is bendable whereby the sides 2 may be separated sufficiently to insert the pulley wheel 6 therebetween as well as between the pivot portions 7 after which the sides may be returned so that their inwardly bent portions 4 will lie adjacent to each other and the pivot portions 7 will enter the axial opening in the pulley wheel.

For the purpose of more readily permitting of the insertion of the pulley wheel and at the same time of making strong pivot portions, the same are formed integral with the sides of the frame and are of increasing length from their sides nearest the base of the frame to the sides farthest therefrom so that the ends 8 of the pivot portions are inclined toward each other away from the base of the frame and will be substantially parallel to each other when the sides 2 of the frame are sufficiently separated to permit of the insertion of the pulley wheel 6. Furthermore, by reason of this construction, the effective bearing surfaces of the pivot portions are the greatest where needed, since the stress placed upon the pulley wheel is in the direction toward the base 3 of the frame.

Figure 5:
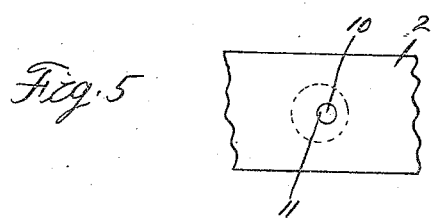
Figure 5 is a diagrammatic view showing the method of forming the pivot portions.

As shown in Figure 5, these pivot portions are formed from the sides 2 by first forming the aperture as by punching in each side with its center 10 offset from the axis 11 of the pivot portion and then by drawing out the metal with a die, the axis of the end of which is correspondingly offset from the main axis thereof. With this method the effective bearing surface of each pivot portion is of greater length than and of the same strength as the bearing surface of a pivot portion having a mean length.

Figure 4:
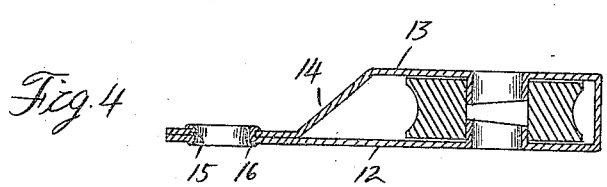
Figure 4 is a central longitudinal cross section through a modification.

As shown in the modification in Figure 4, one side 12 of the U-shaped frame is flat and the other side 13 has the inwardly bent portion 14 at its free end which extends adjacent to the free end of the side 12. For securing the free ends of the sides 12 and 13 to each other, the side 12 has the cylindrical flange 15 which extends through an aperture in the inwardly bent portion 14 and is peened over the outer face of the latter. For the purpose of more readily permitting this pulley to swing about the pivot which extends through the cylindrical flange 15 and at the same time to permit of the flat side 12 to lie adjacent the support for the pivot, the cylindrical flange 15 extends beyond the outer face of the flat side 12 to form the annular bearing 16 which will engage the support.

From the above description it will be readily seen that the pulley frame may be stamped out of a flat blank and that the pulley wheel is easily engaged with the pivot portions of the frame. Furthermore, a bearing is provided upon the flat side of the frame for engaging the side of the adjacent support and reducing the friction between the frame and support due to swinging of the former.

What I claim as my invention is:

1. In a pulley, the combination with a bendable U-shaped frame provided with a transverse pivot portion extending inwardly from one of its sides, said pivot portion having a length on the side farthest from the base of the U greater than that on the side nearest to the base, of a pulley wheel insertable between the sides of the frame and engageable over the pivot portion when the sides are separated.

2. In a pulley, the combination with a bendable U-shaped frame, comprising sides and a base, pivot portions extending inwardly from said sides in substantial axial alignment with each other and having their ends inclined toward each other in a direction away from said base, of a pulley wheel insertible between said sides when the sides are separated and engageable over said pivot portions when the sides are moved to closed position.

3. In a pulley, a U-shaped frame comprising sides and a base, a pivot portion extending inwardly from one of said sides and having progressively increasing length from the side nearest to said base to the side farthest from said base, and means for securing said frame sides in fixed relation to each other.

4. In a pulley, the combination with a U-shaped frame having a flat side and a side with an inwardly bent portion, a pivot portion upon one of said sides and extending inwardly therefrom, of a pulley wheel rotatably mounted upon said pivot portion, and means for securing said flat side to the inwardly bent portion of said other side, said means extending beyond the outer surface of said flat side to form a bearing.

5. In a pulley, the combination with a U-shaped frame having a flat side and a side with its free end bent inwardly to lie adjacent to said flat side, and an integral pivot portion extending inwardly from one of said sides, of a pulley wheel rotatably mounted upon said pivot portion, and a cylindrical flange upon one of said sides extending through the other and peened thereover for securing the free ends of said sides together, said flange extending outwardly beyond the outer surface of said flat side to form a bearing.

6. An integral sheet metal pulley housing comprising a bendable U-shaped frame having contacting free ends, and pivot portions extending inwardly from the sides of said frame, said pivot portions being provided with inclined ends.

In testimony whereof I affix my signature.

FRED HASKEL.